US012602537B2

(12) United States Patent
Dowalter et al.

(10) Patent No.: US 12,602,537 B2
(45) Date of Patent: *Apr. 14, 2026

(54) METHODS FOR SERVING INTERACTIVE CONTENT TO A USER

(71) Applicant: Yieldmo, Inc., Nashua, NH (US)

(72) Inventors: Jarrod Dowalter, Nashua, NH (US); Lorena Ospina, Nashua, NH (US); Ying Chen, Nashua, NH (US); David Sebag, Nashua, NH (US)

(73) Assignee: Yieldmo, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/231,250

(22) Filed: Jun. 6, 2025

(65) Prior Publication Data

US 2025/0342306 A1     Nov. 6, 2025

Related U.S. Application Data

(63) Continuation-in-part of application No. 19/072,239, filed on Mar. 6, 2025, which is a continuation of
(Continued)

(51) Int. Cl.
*G06F 40/143* (2020.01)
*G06F 3/04812* (2022.01)
(Continued)

(52) U.S. Cl.
CPC ........ *G06F 40/143* (2020.01); *G06F 3/04812* (2013.01); *G06F 3/0485* (2013.01);
(Continued)

(58) Field of Classification Search
CPC .. G06F 40/143; G06F 3/0488; G06F 3/04812; G06F 3/0485; G06F 40/106;
(Continued)

(56) References Cited

U.S. PATENT DOCUMENTS 6,760,536 B1 * 7/2004 Amir ................... G11B 27/005
                                                        386/346
6,782,188 B1 * 8/2004 Ido ....................... G11B 27/036
                                                        386/323
(Continued)

FOREIGN PATENT DOCUMENTS

AU      2013332591 A1 * 4/2015 .......... G06F 40/166
AU      2014278676 A1 * 12/2015 ............. G06Q 30/02
(Continued)

*Primary Examiner* — Steven P Sax
(74) *Attorney, Agent, or Firm* — Run8 Patent Group, LLC; Peter Miller; Madison Tyrcha

(57)          ABSTRACT
A method includes: accessing an interactive digital ad including a sequence of frames; and compiling the sequence of frames into an image file. This method includes, at an electronic document on a computing device: rendering a first region of the image file within a first overlay; in response to a first scroll event locating an ad slot, at a first vertical position within the electronic document, into the viewing window, rendering a second region of the image file within the ad slot; and, in response to a second scroll event moving the ad slot over a sequence of vertical positions above the first vertical position within the viewing window, rendering a sequence of regions of the image file within the ad slot, the sequence of regions of the image file corresponding to the sequence of vertical positions.

18 Claims, 6 Drawing Sheets

Related U.S. Application Data application No. 18/373,852, filed on Sep. 27, 2023, now Pat. No. 12,271,683, which is a continuation of application No. 18/107,884, filed on Feb. 9, 2023, now Pat. No. 11,809,811, which is a continuation of application No. 17/039,961, filed on Sep. 30, 2020, now Pat. No. 11,604,918, which is a continuation of application No. 15/937,062, filed on Mar. 27, 2018, now Pat. No. 10,832,729, which is a continuation of application No. 15/816,833, filed on Nov. 17, 2017, now Pat. No. 9,966,109, which is a continuation of application No. 15/217,879, filed on Jul. 22, 2016, now Pat. No. 9,852,759, which is a continuation-in-part of application No. PCT/US2015/064460, filed on Dec. 8, 2015.

(60) Provisional application No. 63/656,998, filed on Jun. 6, 2024, provisional application No. 62/197,929, filed on Jul. 28, 2015, provisional application No. 62/068,646, filed on Oct. 25, 2014.

(51) Int. Cl.

| | |
|---|---|
| *G06F 3/0485* | (2022.01) |
| *G06F 3/0488* | (2022.01) |
| *G06F 40/106* | (2020.01) |
| *G06Q 30/02* | (2023.01) |
| *G11B 27/00* | (2006.01) |
| *G11B 27/031* | (2006.01) |
| *G11B 27/036* | (2006.01) |
| *G11B 27/10* | (2006.01) |
| *G11B 27/11* | (2006.01) |
| *G11B 27/30* | (2006.01) |
| *H04N 21/431* | (2011.01) |
| *H04N 21/433* | (2011.01) |
| *H04N 21/442* | (2011.01) |
| *H04N 21/472* | (2011.01) |
| *H04N 21/482* | (2011.01) |
| *H04N 21/81* | (2011.01) |
| *H04L 67/02* | (2022.01) |

(52) U.S. Cl.
CPC .......... *G06F 3/0488* (2013.01); *G06F 40/106* (2020.01); *G06Q 30/02* (2013.01); *G11B 27/005* (2013.01); *G11B 27/031* (2013.01); *G11B 27/036* (2013.01); *G11B 27/102* (2013.01); *G11B 27/11* (2013.01); *G11B 27/3081* (2013.01); *H04N 21/431* (2013.01); *H04N 21/4333* (2013.01); *H04N 21/44204* (2013.01); *H04N 21/47217* (2013.01); *H04N 21/482* (2013.01); *H04N 21/812* (2013.01); *H04L 67/02* (2013.01)

(58) Field of Classification Search
CPC ............. G06F 3/04855; G06F 17/2247; G06F 17/212; G06F 3/0482; G06F 3/0484; G06F 3/0487; H04N 21/47217; H04N 21/812; H04N 21/482; H04N 21/4333; H04N 21/44204; H04N 21/431; H04N 21/472; H04N 21/25841; G06Q 30/02; G11B 27/031; G11B 27/036; G11B 27/005; G11B 27/102; G11B 27/11;

G11B 27/3081; H04L 67/02; H05N 21/4331
See application file for complete search history.

(56) References Cited

U.S. PATENT DOCUMENTS

| | | | | |
|---|---|---|---|---|
| 6,807,367 | B1 * | 10/2004 | Durlach | G09B 5/06 |
| | | | | 386/221 |
| 7,348,967 | B2 * | 3/2008 | Zadesky | G06F 1/1626 |
| | | | | 345/157 |
| 7,804,506 | B2 * | 9/2010 | Bates | G06T 7/246 |
| | | | | 345/589 |
| 8,701,145 | B1 * | 4/2014 | Berger | H04N 21/2668 |
| | | | | 725/35 |
| 8,875,023 | B2 * | 10/2014 | Cronin | G06F 3/0484 |
| | | | | 715/722 |
| 9,247,313 | B1 * | 1/2016 | Lewis | H04N 21/6587 |
| 9,286,622 | B2 * | 3/2016 | Choi | G06Q 30/0269 |
| 9,448,723 | B2 * | 9/2016 | Wong | G06F 3/04886 |
| 9,707,481 | B2 * | 7/2017 | Perlman | H04N 21/4781 |
| 9,733,809 | B1 * | 8/2017 | Greene | G06F 3/0486 |
| 9,852,759 | B2 * | 12/2017 | Doherty | H04N 21/47217 |
| 10,032,303 | B2 * | 7/2018 | Naveh | G06T 19/20 |
| 10,467,652 | B2 * | 11/2019 | McConnell | G06Q 30/0245 |
| 11,809,811 | B2 * | 11/2023 | Doherty | H04N 21/812 |
| 2002/0122060 | A1 * | 9/2002 | Markel | G06F 40/143 |
| | | | | 715/760 |
| 2006/0059426 | A1 * | 3/2006 | Ogikubo | G11B 27/34 |
| | | | | 386/230 |
| 2007/0066403 | A1 * | 3/2007 | Conkwright | A63F 13/803 |
| | | | | 463/43 |
| 2007/0189708 | A1 * | 8/2007 | Lerman | G11B 27/34 |
| | | | | 386/280 |
| 2007/0239566 | A1 * | 10/2007 | Dunnahoo | G06Q 40/00 |
| | | | | 705/26.1 |
| 2008/0115062 | A1 * | 5/2008 | Ngan | G11B 27/34 |
| | | | | 715/723 |
| 2008/0152297 | A1 * | 6/2008 | Ubillos | G06F 3/0486 |
| | | | | 386/282 |
| 2008/0300872 | A1 * | 12/2008 | Basu | G06F 16/7844 |
| | | | | 704/235 |
| 2009/0079823 | A1 * | 3/2009 | Bellamy | G08B 13/1968 |
| | | | | 348/143 |
| 2009/0149749 | A1 * | 6/2009 | Heron | G01S 7/52088 |
| | | | | 600/509 |
| 2009/0265243 | A1 * | 10/2009 | Karassner | G06Q 30/0275 |
| | | | | 705/14.54 |
| 2010/0031149 | A1 * | 2/2010 | Gentile | H04N 5/91 |
| | | | | 348/135 |
| 2010/0153544 | A1 * | 6/2010 | Krassner | G06F 40/143 |
| | | | | 709/224 |
| 2010/0274674 | A1 * | 10/2010 | Roberts | H04N 21/8456 |
| | | | | 715/720 |
| 2010/0312854 | A1 * | 12/2010 | Hyman | G06Q 30/02 |
| | | | | 709/224 |
| 2011/0035263 | A1 * | 2/2011 | Ramanathan | G06Q 30/02 |
| | | | | 705/14.4 |
| 2011/0125571 | A1 * | 5/2011 | Jagadish | G06Q 30/0256 |
| | | | | 705/14.54 |
| 2013/0088520 | A1 * | 4/2013 | Mak | G06F 3/0488 |
| | | | | 345/684 |
| 2013/0148861 | A1 * | 6/2013 | Ferlatte | G06V 20/42 |
| | | | | 382/107 |
| 2013/0151970 | A1 * | 6/2013 | Achour | G06Q 10/101 |
| | | | | 715/723 |
| 2013/0195421 | A1 * | 8/2013 | Chen | G11B 27/034 |
| | | | | 348/E7.003 |
| 2013/0198608 | A1 * | 8/2013 | Krassner | G06F 40/143 |
| | | | | 715/234 |
| 2013/0211887 | A1 * | 8/2013 | Kim | G06Q 30/0241 |
| | | | | 705/14.4 |
| 2014/0095328 | A1 * | 4/2014 | Forouzandeh | G06Q 30/0277 |
| | | | | 705/14.73 |

(56)  References Cited

U.S. PATENT DOCUMENTS

| 2014/0150026 A1* | 5/2014 | Mountain | H04N 21/42204 |
| | | | 725/52 |
| 2014/0164921 A1* | 6/2014 | Salinas | G06F 16/29 |
| | | | 715/716 |
| 2014/0188606 A1* | 7/2014 | Moore | G06Q 30/0251 |
| | | | 705/14.49 |
| 2014/0289241 A1* | 9/2014 | Anderson | G06F 16/48 |
| | | | 707/736 |
| 2014/0380394 A1* | 12/2014 | Perron | H04N 21/2665 |
| | | | 725/116 |
| 2015/0007101 A1* | 1/2015 | Lewis | G06F 3/0485 |
| | | | 715/784 |
| 2015/0081695 A1* | 3/2015 | Schillings | G06F 16/9535 |
| | | | 707/736 |
| 2015/0082339 A1* | 3/2015 | Sumitomo | H04N 21/812 |
| | | | 725/32 |
| 2015/0106712 A1* | 4/2015 | Oh | G06F 3/0482 |
| | | | 715/716 |
| 2015/0221335 A1* | 8/2015 | Licata | H04N 5/783 |
| | | | 386/279 |
| 2015/0373392 A1* | 12/2015 | Sriraman | H04N 21/4821 |
| | | | 725/52 |

| 2016/0018983 A1* | 1/2016 | Bostick | G06F 3/0488 |
| | | | 715/720 |
| 2016/0328755 A1* | 11/2016 | Uchida | G06F 16/958 |
| 2018/0032997 A1* | 2/2018 | Gordon | G06Q 30/0269 |

FOREIGN PATENT DOCUMENTS

| BR | 102014006152 A2 | * | 2/2016 | G06F 3/04883 |
| CA | 2298049 C | * | 4/2010 | G06F 3/04855 |
| CA | 2819136 A1 | * | 6/2012 | G06F 3/04817 |
| CN | 100368969 C | * | 2/2008 | G06F 3/03543 |
| CN | 100409358 C | * | 8/2008 | G11B 27/105 |
| CN | 102084386 A | * | 6/2011 | G06Q 30/0251 |
| CN | 103187015 A | * | 7/2013 | |
| CN | 104574125 A | * | 4/2015 | |
| CN | 105493017 A | * | 4/2016 | G06F 3/04855 |
| CN | 107403338 A | * | 11/2017 | H04L 43/04 |
| CN | 103713801 B | * | 4/2018 | G06T 3/20 |
| EP | 1538536 A1 | * | 6/2005 | G06F 3/04883 |
| JP | 2004519968 A | * | 7/2004 | G11B 27/28 |
| JP | 4787408 B2 | * | 10/2011 | H04N 7/08 |
| JP | 6619734 B2 | * | 12/2019 | G06Q 30/0246 |
| WO | WO-2010071666 A1 | * | 6/2010 | H04L 67/535 |

* cited by examiner

S100

AD SLOT1:
IMAGE PLAYER

"USER DEVICE"

"AD 1"

S160
DETECT SET OF SCROLL EVENTS = ENGAGEMENT DATA

S162
CHARACTERIZING AN ENGAGEMENT LEVEL

"ENGAGEMENT LEVEL"

AD 1 - VIDEO FORMAT
AD 2 - SCROLL FORMAT
AD 3 - VIDEO FORMAT

AD CAMPAIGN 31

REMOTE COMPUTER SYSTEM

AD SLOT2:
IMAGE PLAYER

"USER DEVICE"

"AD 3"
S164

Y    ENGAGEMENT SCORE > THRESHOLD?

S163
CALCULATE ENGAGEMENT SCORE FOR AD 1 IN AD SLOT 1

METHODS FOR SERVING INTERACTIVE CONTENT TO A USER

CROSS-REFERENCE TO RELATED APPLICATIONS

This Application is a continuation-in-part application of U.S. patent application Ser. No. 19/072,239, filed on 6 Mar. 2025, which is a continuation application of U.S. patent application Ser. No. 18/373,852, filed on 27 Sep. 2023, which is a continuation application of U.S. patent application Ser. No. 18/107,884, filed on 9 Feb. 2023, which is a continuation application of U.S. patent application Ser. No. 17/039,961, filed on 30 Sep. 2020, which is a continuation application of U.S. patent application Ser. No. 15/937,062, filed on 27 Mar. 2018, which is a continuation application of U.S. patent application Ser. No. 15/816,833, filed on 17 Nov. 2017, which is a continuation application of U.S. patent application Ser. No. 15/217,879, filed on 22 Jul. 2016, which claims priority to U.S. Provisional Application No. 62/197,929, filed on 28 Jul. 2015 and is a continuation-in-part application of PCT Application No. PCT/US15/64460, filed on 8 Dec. 2015, which claims priority to U.S. Provisional Application No. 62/068,646, filed on 25 Oct. 2014, all of which are incorporated in their entireties by this reference.

This Application claims the benefit of U.S. Provisional Application No. 63/656,998 filed on 6 Jun. 2024, which is incorporated in its entirety by this reference.

TECHNICAL FIELD

This invention relates generally to the field of digital advertising and, more specifically, to new and useful methods for serving interactive content to a user in the field of digital advertising.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1A:
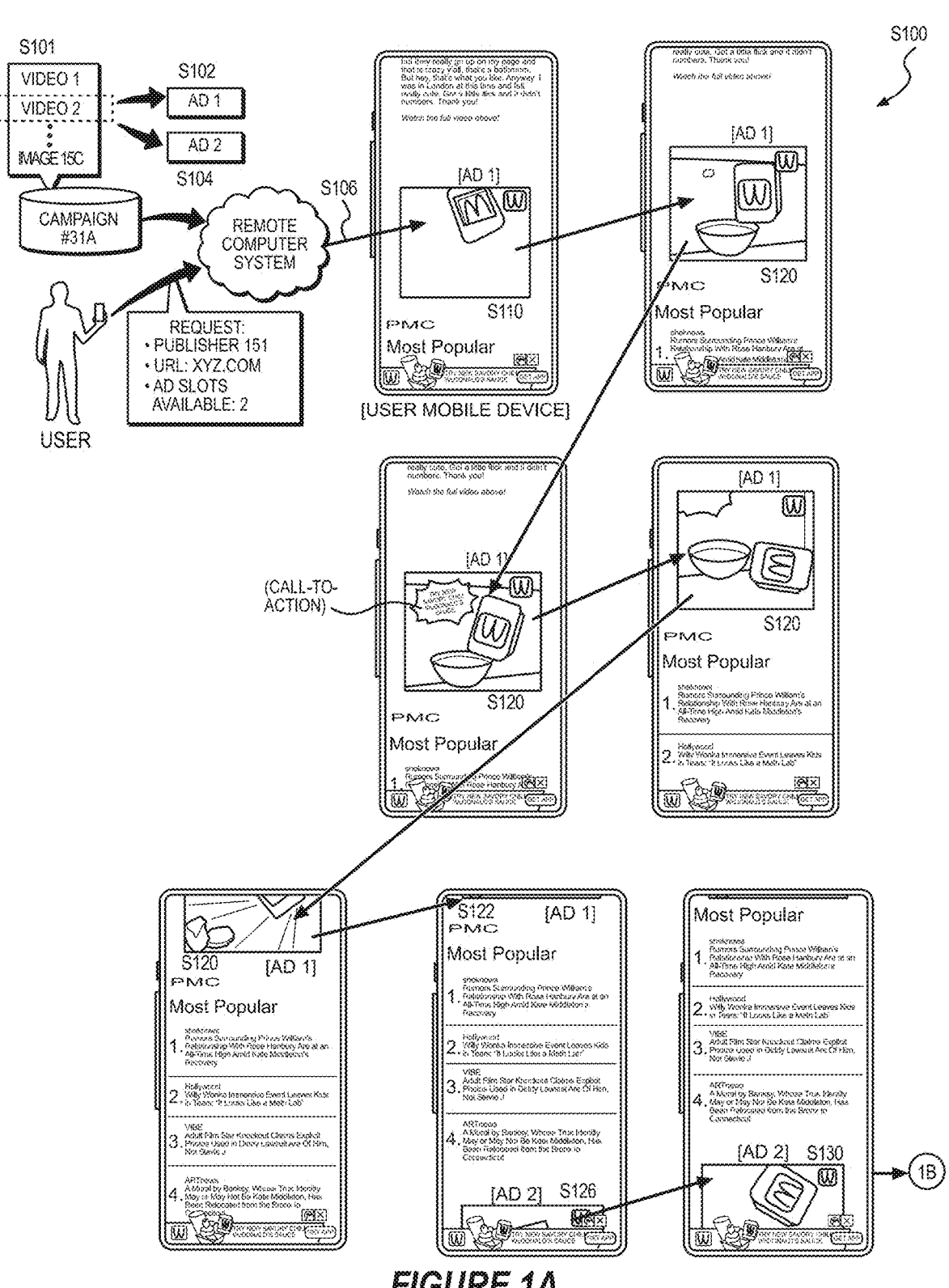
FIGS. 1A and 1B are flowchart representations of a method.
Figure 1B:
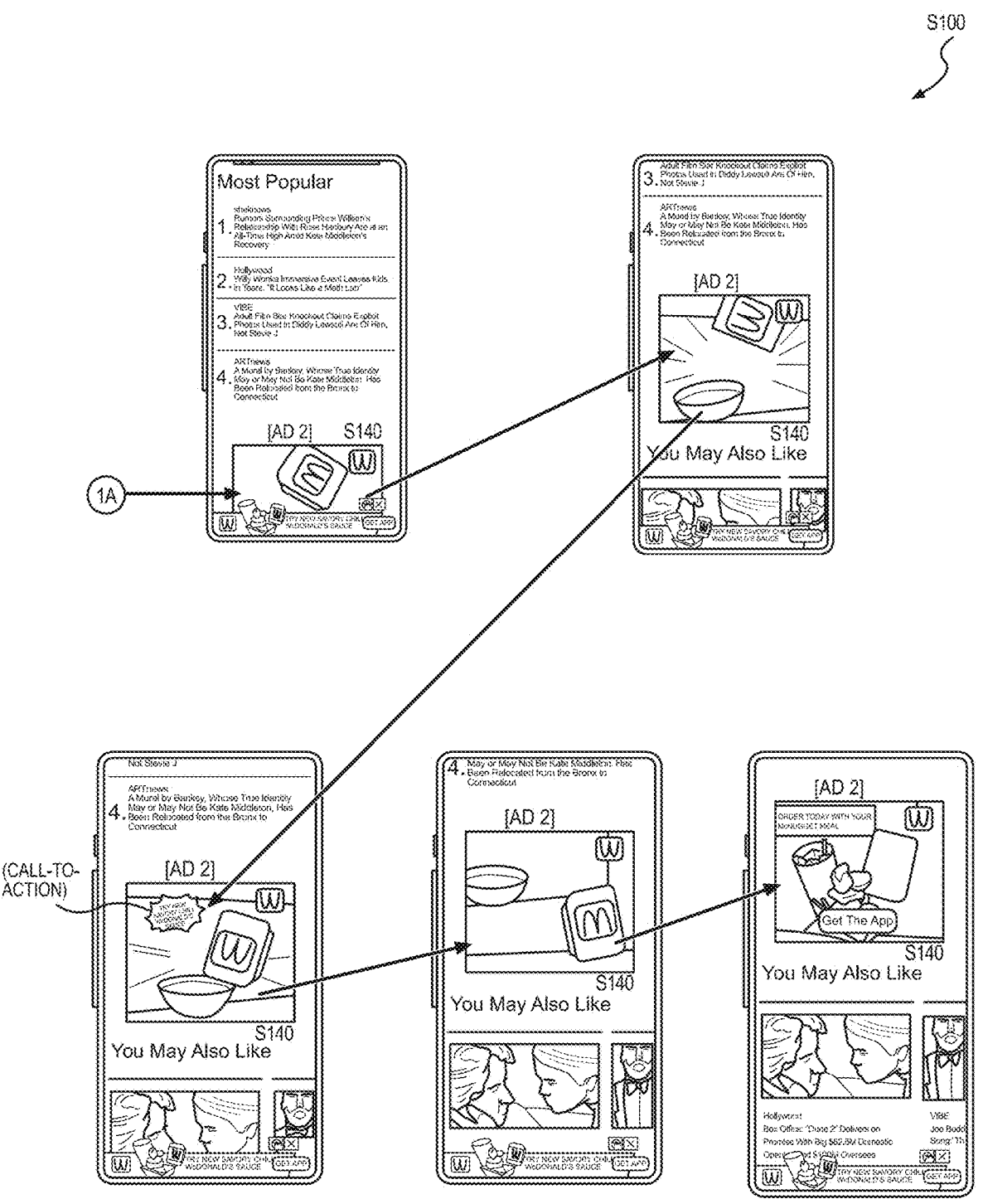
Figure 2:
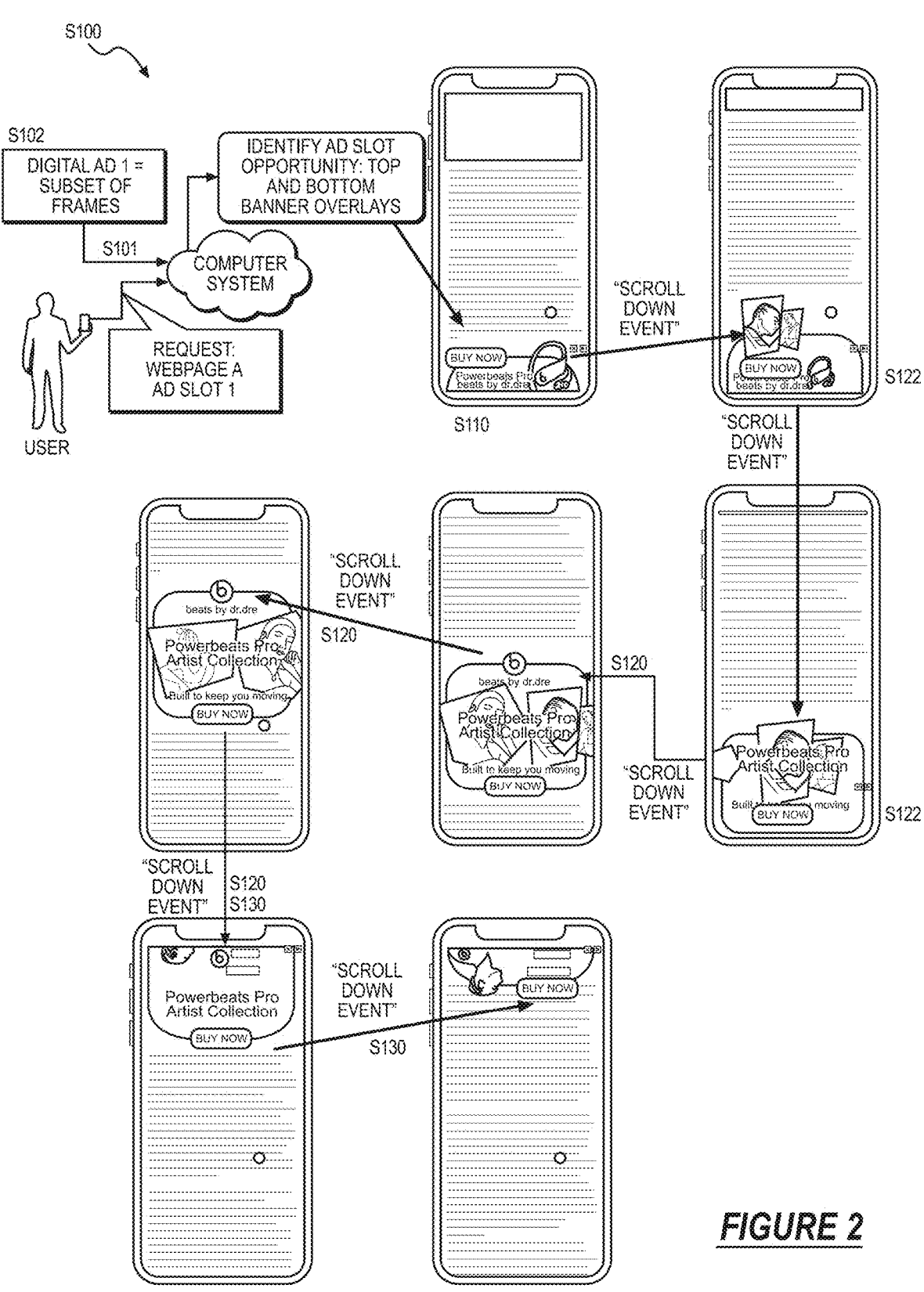
FIG. 2 is a flowchart representation of one variation of the method.
Figure 3:
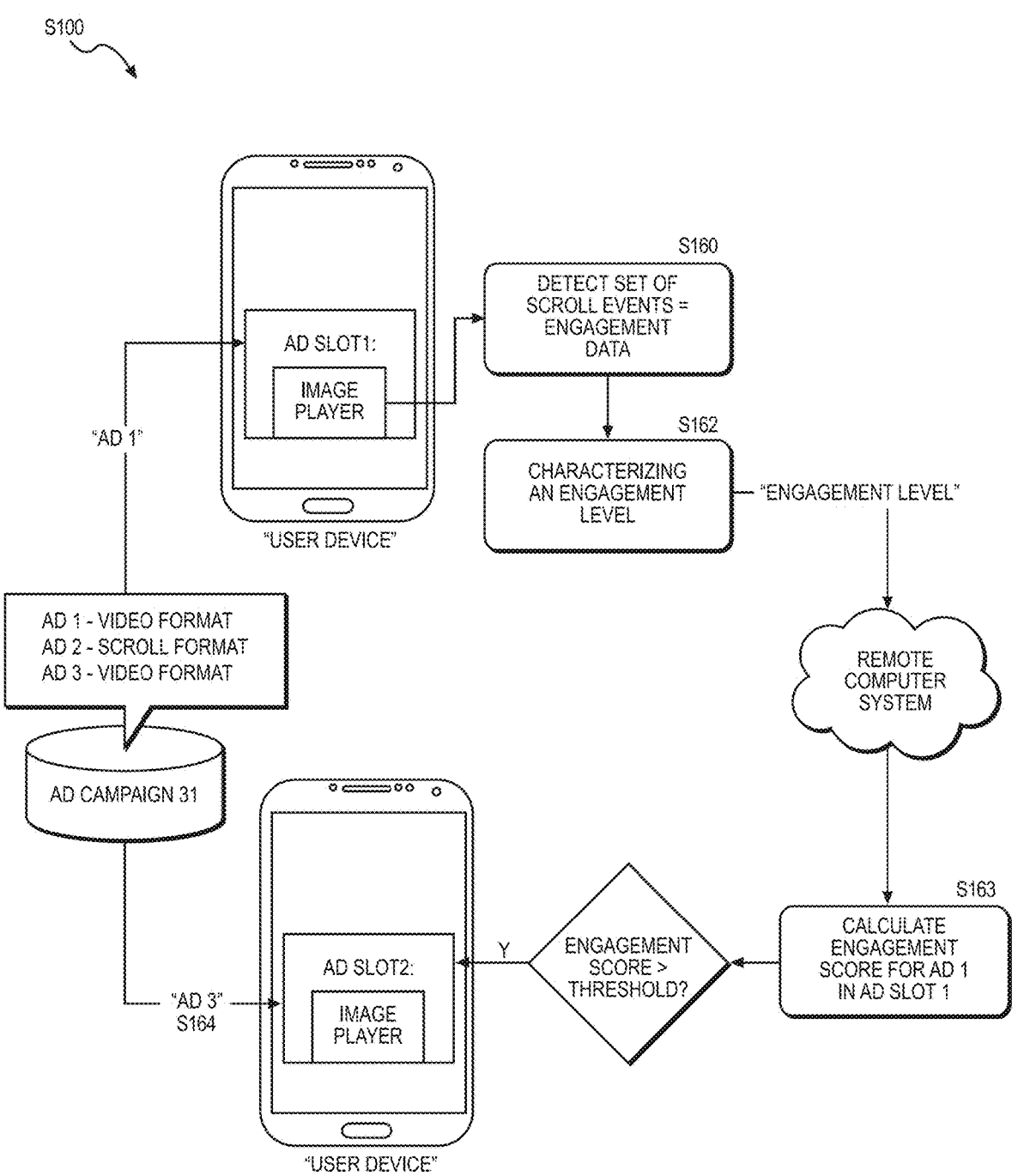
FIG. 3 is a flowchart representation of one variation of the method.
Figure 4:
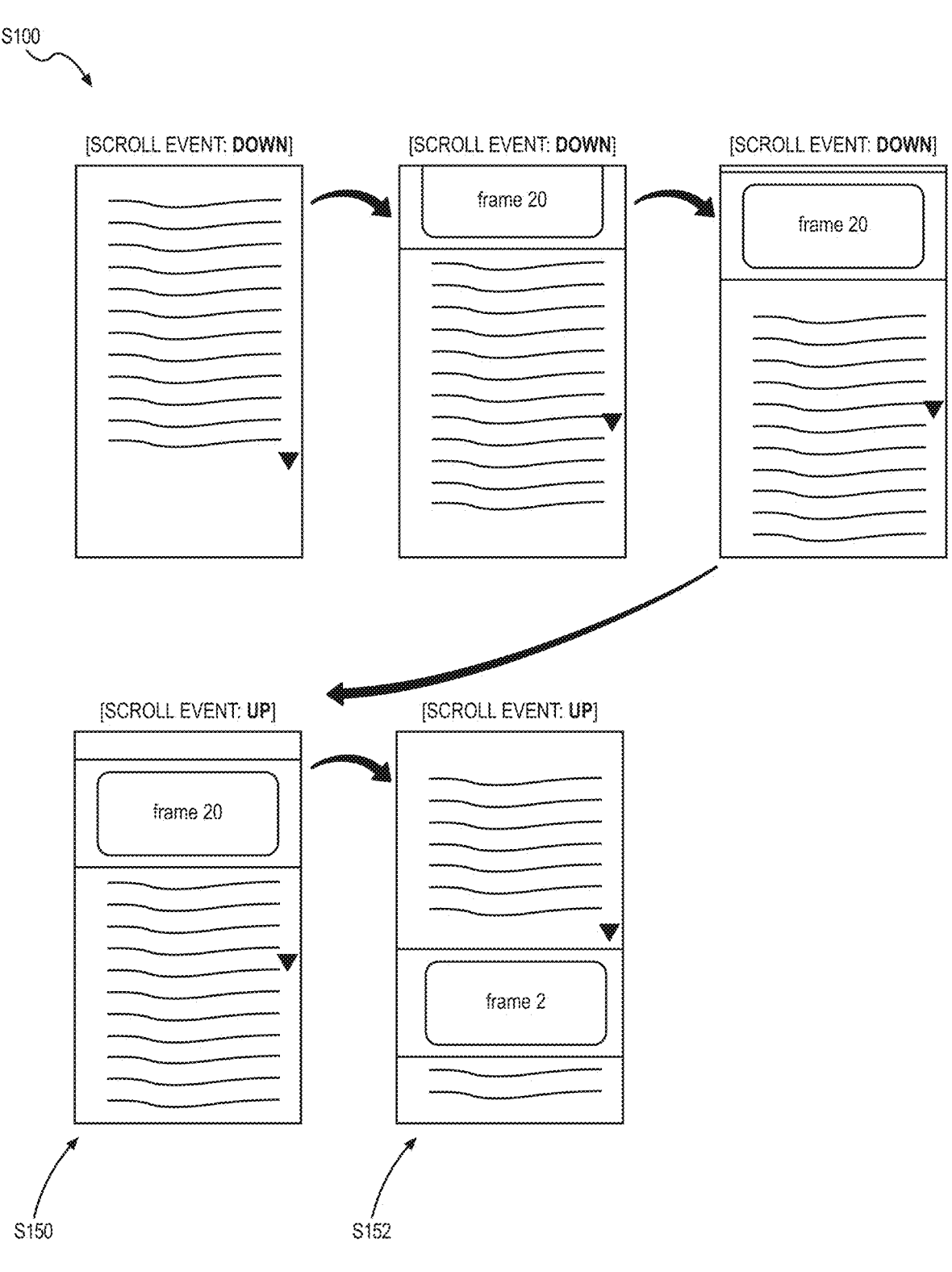
FIG. 4 is a flowchart representation of one variation of the method.
Figure 5:
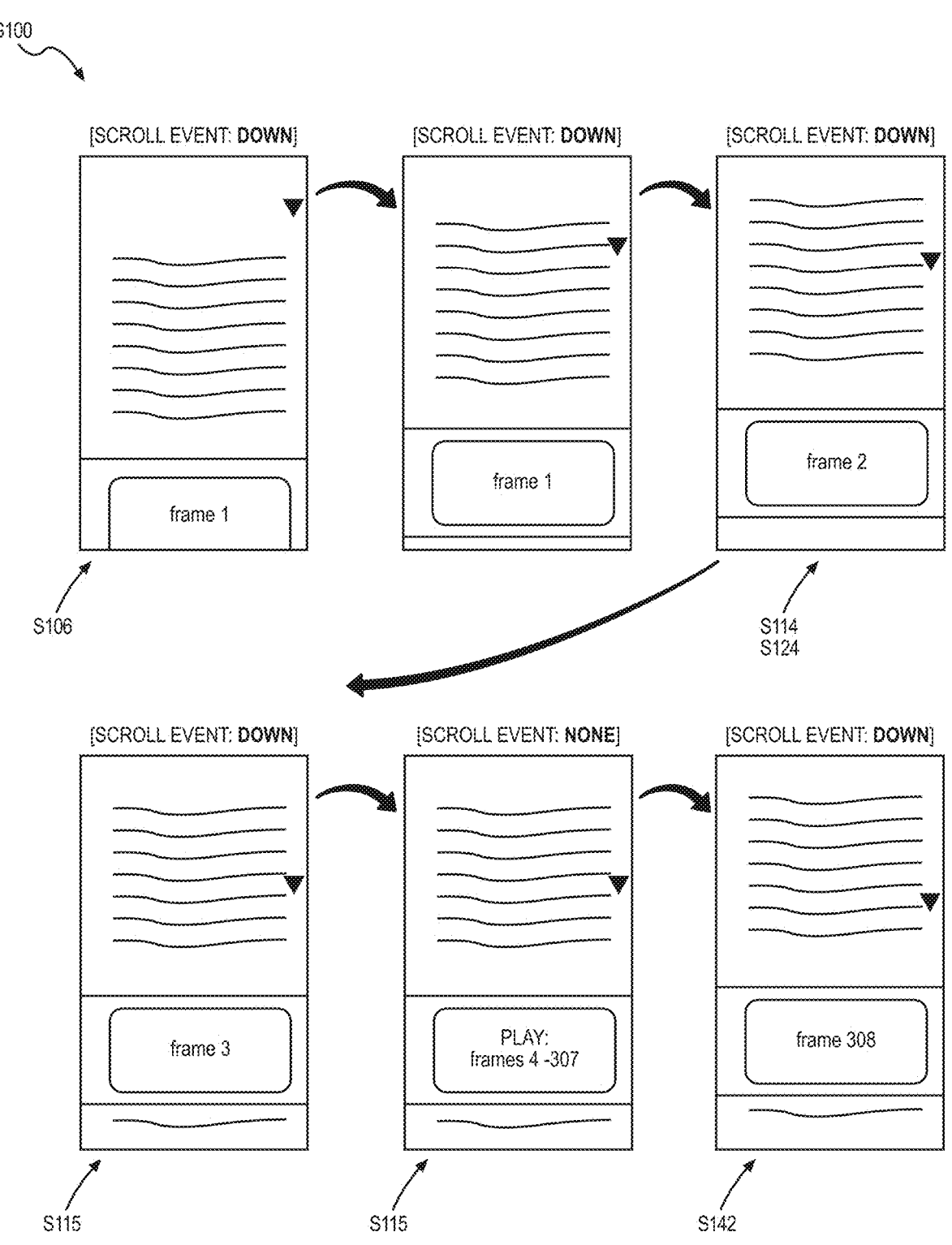
FIG. 5 is a flowchart representation of one variation of the method.

As shown in FIGS. 1A and 1B, a method S100 includes: accessing a first interactive digital ad including a first sequence of frames in Block S101; compiling a first subset of frames, in the first sequence of frames, into a first image file in Block S102; and compiling a second subset of frames, in the first sequence of frames, into a second image file in Block S104. The method further includes, at an electronic document rendered by a computing device accessed by a user: in response to a first scroll event locating a first ad slot at a first vertical position within a viewing window of the computing device, rendering a first region of the first image file within the first ad slot in Block S110; in response to a second scroll event moving the first ad slot over a first sequence of vertical positions above the first vertical position within the viewing window, rendering a first sequence of regions of the first image file within the first ad slot, the first sequence of regions corresponding to the first sequence of vertical positions of the first ad slot within the viewing window in Block S120; in response to a third scroll event moving the first ad slot to a second vertical position above the first sequence of vertical positions and moving a second ad slot into a third vertical position, below the second vertical position, within the viewing window, the second ad slot located below the first ad slot within the electronic document, rendering a third region of the first image file, corresponding to a final frame, in the first subset of frames, within the first ad slot in Block S122 and rendering a fourth region of the second image file, corresponding to an initial frame in the second subset of frames, within the second ad slot, the first frame in the second subset of frames succeeding the final frame in the first subset of frames within the first sequence of frames of the first interactive digital ad in Block S126; and, in response to a fourth scroll event moving the second ad slot over a second sequence of vertical positions above the third vertical position within the viewing window, rendering a second sequence of regions of the second image file within the second ad slot, the second sequence of regions corresponding to the second sequence of vertical positions of the second ad slot within the viewing window in Block S130.

1.1 Variation: Digital Video

One variation of the method S100 includes: accessing a digital video including a sequence of frames in Block S101; generating a first interactive digital ad including a first subset of frames, in the sequence of frames in Block S102; and generating a second interactive digital ad including a second subset of frames, in the sequence of frames in Block S104. This variation of the method S100 further includes, at an electronic document rendered by a computing device accessed by a user: inserting the first interactive digital ad into a first ad slot and the second interactive digital ad into a second ad slot on the electronic document in Block S106; in response to a first scroll event locating the first ad slot, at a first position within the electronic document, into a viewing window of the computing device initiating forward playback of the first interactive digital ad at the first ad slot in Block S114 and seeking through the first subset of frames, in the sequence of frames, during playback of the first interactive digital ad at the first ad slot in Block S115; and, in response to a second scroll event moving the first ad slot out of the viewing window and moving the second ad slot, located below the first ad slot within the electronic document, into the viewing window, initiating forward playback of the second interactive digital ad at the second ad slot in Block S124 and displaying a second subset of frames, in the sequence of frames and succeeding the first subset of frames, during playback of the second interactive digital ad at the second ad slot in Block S120.

1.2 Variation: Overlays+Ad Slot

Another variation of the method S100 includes: accessing a first interactive digital ad including a first sequence of frames in Block S101; and compiling the first sequence of frames into a first image file in Block S102. This variation of the method S100 further includes, at an electronic document rendered by a computing device accessed by a user: rendering a first region of the first image file within a first overlay proximal a bottom of a viewing window of the computing device in Block S110; in response to a first scroll event locating a first ad slot, at a first vertical position within the electronic document, into the viewing window, rendering a second region of the first image file within the first ad slot in Block S124; in response to a second scroll event moving the first ad slot over a sequence of vertical positions above the first vertical position within the viewing window, rendering a sequence of regions of the first image file within the first ad slot, the sequence of regions of the first image file corresponding to the sequence of vertical positions of the first ad slot within the viewing window in Block S120; and, in response to a third scroll event moving the first ad slot to a second vertical position out of the viewing window, rendering a final region of the first static image file within a second overlay at a third vertical position proximal a top of the viewing window in Block S130.

1.3 Variation: Digital Video+Scroll-Down

As shown in FIGS. 1A and 1B, yet another variation of the method S100 includes: accessing a digital video—including a sequence of frames—from a database; selecting a first subset of frames, in the sequence of frames, from a first segment of the digital video; compiling the first subset of frames into a first static image file in Block S102; selecting a second subset of frames, in the sequence of frames, from a second segment of the digital video succeeding the first segment; and compiling the second subset of frames into a second static image file in Block S104. The method S100 further includes, at a computing device accessed by a user: at a first time, in response to an event (e.g., a scroll event, a click event) that locates a first image player—inserted into a first ad slot located at a first position within a webpage rendered by the computing device—into view of a viewing window of the computing device, rendering a first region of the first image file—corresponding to a first frame in the first subset of frames—within the first image player in Block S110; and, at a second time succeeding the first time, in response to a first scroll-down event that moves the first image player over a first sequence of positions above the first position within the window, rendering a first sequence of regions of the first image file—corresponding to a sequence of frames, in the first subset of frames, succeeding the first frame—within the first image player, the first sequence of regions corresponding to a first sequence of positions of the first image player within the window in Block S120.

The method S100 further includes, at a third time succeeding the second time, in response to a second scroll-down event that moves the first image player to a second position—proximal a top of the webpage—above the first sequence of positions within the window, and moves a second image player—inserted into a second ad slot located below the first ad slot within the webpage—into view of the viewing window: rendering a third region of the first image file—corresponding to a final frame in the first subset of frames—within the first image player; and rendering a first region of the second image file—corresponding to a first frame in the second subset of frames—within the second image player, the first frame, in the second subset of frames, sequentially succeeding the final frame, in the first subset of frames, within the sequence of frames of the digital video in Block S130. The method S100 further includes, in response to a third scroll-down event that moves the second image player over a second sequence of positions above the second position within the window, rendering a second sequence of regions of the second image file—corresponding to a sequence of frames, in the second subset of frames, succeeding the first frame—within the second image player, the second sequence of regions corresponding to a second sequence of positions of the second image player within the window in Block S140.

2. Applications

Generally, Blocks of the method S100 can be executed by a computer system —such as a remote server functioning as or interfacing with an ad server—to: compile interactive digital ads of varying formats and associated with a single ad campaign; and selectively serve these interactive digital ads to an electronic document (e.g., a webpage, a landing page in a native application)—rendered by a computing device accessed by a user—for presentation within a suite of ad slots consecutively inserted and concurrently (partially) visible within the electronic document.

In particular, Blocks of the method S100 can be executed by a computer system to: generate an ad package—including two or more interactive digital ads (or an "ad package") of varying formats and associated with a single ad campaign— configured to communicate a cohesive and/or continuous "story" associated with a particular product or brand; and selectively serve this ad package to a webpage—rendered by a computing device accessed by a user—for presentation within a suite of ad slots inserted (e.g., pre-loaded, generated in real-time) within the webpage for viewing by the user.

For example, the computer system can: access an ad package—including a first interactive digital ad and a second interactive digital ad—associated with an ad campaign; serve the first interactive digital ad—depicting a first set of content (e.g., video, images, text) associated with a particular theme or subject defined for the ad campaign—to a first image player for presentation within a first ad slot loaded within the webpage rendered by a computing device accessed by a user; and serve the second interactive digital ad—depicting a second set of content associated with the particular theme or subject defined for the ad campaign, such that the second set of content is distinct but related to the first set of content—to a second image player for presentation within a second ad slot located below the first ad slot within the webpage. The computer system can therefore leverage presentation of the first and second interactive digital ads within the first and second ad slots—inserted sequentially (e.g., from top to bottom) within the webpage—to communicate a cohesive and/or continuous story associated with the particular theme or subject.

In particular, in one example, the computer system can: receive a first interactive digital ad including a sequence of frames depicting a particular icon (e.g., a rolling ball); and segment the sequence of frames into subsets of frames and compile these subsets of frames into static image files. Then, in response to initiation of a webpage on a user device (e.g., by detecting availability of a series of ad slots on the webpage), the computer system can: insert a static image file—including a particular subset of frames —into each ad slot in the series of ad slots; and link each frame in these subsets of frames —in the sequence of frames of the (original) interactive digital ad—to vertical positions of the series of ad slots on the webpage. Each ad slot can then selectively render regions of a static image file inserted into the ad slot, such that a user scrolling through the webpage may perceive the particular icon as "rolling" (or otherwise translating) from a bottom of a first ad slot—inserted at a first vertical position in the webpage—to a top of a second ad slot located below the first ad slot on the webpage.

The computer system can therefore serve serialized branded content to a user through a sequence of image players loaded within an electronic document (e.g., a webpage, a landing page) accessed through a web browser or embedded into a native application executing on a smartphone, tablet, smart watch, laptop computer, desktop computer, or other computing device.

Furthermore, the computer system can serve interactive digital ads of particular interactive formats configured to drive user engagement with these interactive digital ads and to enhance user perception of continuity between interactive digital ads presented within the webpage. In one example, the computer system can serve a set of interactive digital ads—including a first interactive digital ad and a second interactive digital ad—of a scroll-type format configured to update content rendered within the set of interactive digital ads responsive to scroll events (e.g., scroll-down event, scroll-up event) entered by the user within the webpage. In particular, the first interactive digital ad and the second interactive digital ad can be configured to seek or step forward through a sequence of frames (or a subset of the sequence of frames) during scroll-down events; and seek backward through the sequence of frames (or subset of frames) during scroll-up events, such that rendered content of these interactive digital ads is linked to a vertical position of the interactive digital ad (or image player loaded with the interactive digital ad) within the webpage. In this example, the computer system can thus: serve the first interactive digital ad—such as including a first sequence of frames—to a first image player loaded within a first ad slot proximal a top of a webpage; and serve the second interactive digital ad—such as including a second sequence of frames—to a second image player loaded within a second ad slot below the first ad slot within the webpage. As the user scrolls down within the webpage—with the first image player located within a viewing window of the computing device rendering the webpage—the first image player can seek through frames in the first sequence of frames. Then, as the user continues scrolling within the webpage and the second image player enters a viewing window of the computing device: the first image player can render a final frame in the first sequence of frames; and the second image player can initially render a first frame, in the second sequence of frames, and thus seek through the second sequence of frames. The user may therefore perceive the second sequence of frames—rendered by the second image player —as a direct continuation of the first sequence of frames rendered by the first image player, therefore promoting increased visual engagement by the user between the two interactive digital ads and further contextualizing a cohesive theme or subject presented within the first and second interactive digital ads.

2.1 Variation: Digital Video Ads

In one variation, the computer system can segment a digital video ad into subsets of sequential frames and insert these subsets of sequential frames into a sequence of ad slots in a webpage such that a user may view the entire digital video, in sequence, as the user scrolls through the webpage and views each ad slot in the sequence of ad slots. In particular, a digital video can include a sequence of frames, and the computer system can compile a first subset of frames into a first interactive digital ad and compile a second subset of frames into a second interactive digital ad. Then, at a webpage containing the sequence of ad slots, a first ad slot can render the first subset of frames, and a second ad slot—below the first ad slot—can render the second subset of frames such that a user may perceive a cohesive flow throughout playback of the entire sequence of frames of the digital video.

Accordingly, the second ad slot can receive identification of a final frame rendered within the first ad slot (e.g., via an event dispatcher, via the computer system, via the server, via a browser) such that the second ad slot can render an initial frame, corresponding to (e.g., the same as) the final frame rendered within the first ad slot, to thereby enable a user to view the digital video as a cohesive video (e.g., rather than a sequence of disjoined frames) across a sequence of ad slots across a webpage.

2.2 Ad Opportunity Generation

In one implementation, the computer system can receive identification of multiple ad slots inserted within a webpage and available for presenting multiple interactive digital ads—forming an ad package—from a single ad campaign. Alternatively, in another implementation, the computer system can selectively generate additional ad slots (or "ad opportunities") within a webpage in order to enable presentation of the ad package generated for this single ad campaign. In this implementation, the computer system can therefore increase available ad inventory on a particular webpage, thereby increasing opportunity for revenue generation for a publisher and/or increasing availability of high-engagement ad inventory for advertisers. Further, by generating new ad inventory in (near) real-time, the computer system can promote increased viewability and/or completion rate (e.g., video completion rate) of interactive digital ads—configured to communicate a cohesive story associated with a singular ad campaign—presented across multiple ad slots, thereby enabling increased opportunity for brand lift (e.g., brand awareness) and/or conversions (e.g., product purchases) associated with these interactive digital ads.

3. Multiple Ad Slots: Identification & Generation

Generally, the computer system can serve an ad package across a set of ad slots loaded within a webpage (or any other electronic document). The computer system can thus receive confirmation of availability of multiple ad slots on the webpage prior to selecting a particular ad package for presentation within ad slots on this webpage.

In one implementation, the computer system can: receive confirmation of a suite of ad slots—designated for presenting a suite of interactive digital ads affiliated with a singular ad campaign—on a particular webpage affiliated with a publisher; and assign a particular ad package—such as pre-assigned to this particular webpage and/or in real-time when the webpage is loaded on a user's computing device and/or—for presenting within the suite of ad slots on the webpage. In this implementation, the computer system can therefore leverage multiple, pre-existing ad slots inserted within a webpage to serve an ad package—including multiple interactive digital ads—generated for an ad campaign and configured to visually attract the user's attention (e.g., via responsive formats) to content of these interactive digital ads and sequentially expose the user viewing these interactive digital ads to the ad campaign.

Additionally or alternatively, in another implementation, the computer system can automatically generate additional ad slots on a webpage—such as in (near) real-time as the webpage is loaded by the user's computing device—to enable serving of an ad package generated for an ad campaign within the webpage. For example, the computer system can: detect an opportunity for generating a new ad slot on a webpage; and leverage a set of opportunity characteristics—such as a slot position (e.g., within the webpage), a layout of the webpage, an ad layout on the webpage (e.g., positions of predefined ad slots on the webpage), key content markers on the webpage (e.g., header marker, native visual content)—to selectively render the new ad slot within the window, such that content presented within the new ad slot exhibits minimal interruption to native content on the webpage and/or other ads loaded on the webpage.

In particular, in this implementation, the computer system can: receive identification of a first ad slot loaded on a webpage rendered by a computing device accessed by a user; detect an opportunity for generation of a new ad slot—distinct from existing, predefined ad inventory (e.g., in-line ad slots)—within a webpage; based on characteristics (e.g., ad layout of the webpage, webpage layout, address and/or publisher of the webpage) of the detected opportunity, selectively render a second ad slot—such as a dynamic ad overlay (e.g., a dynamic and/or interactive floater or ad slot)—configured to receive interactive digital ad content for presenting to a user visiting the webpage in (near) real-time; and render a particular interactive digital ad for presentation to the user within the second ad slot, such as prior to an event (e.g., a click event, a scroll event) that locates the second ad slot within a viewing window of the computing device.

For example, the computer system can identify an opportunity for generation of a new ad slot including an overlay proximal a top and/or a bottom of a webpage. In particular, the computer system can, at a webpage on a user device (e.g., upon initiation of the webpage on the user device): generate a first ad slot including a first overlay proximal a bottom of the webpage; render a first portion of a first interactive digital ad in the first overlay (e.g., interactive floater element) proximal the bottom of the webpage; in response to detecting a first scroll-down event moving a second ad slot (e.g., pre-generated and in-line in an article on the webpage) into view of the user device at a first vertical position, render a second portion of the first interactive digital ad in the second ad slot; and, in response to detecting a second scroll-down event moving the second ad slot to a second vertical position above the first vertical position, generating a third ad slot including a second overlay proximal a top of the webpage and rendering a third portion of the first interactive digital ad in the third ad slot.

In this example, the computer system (and/or an image player inserted into the first ad slot) can, in response to a fourth scroll event moving a first portion of the first ad slot to a third vertical position below the second vertical position and into the viewing window, render a third region of the static image file within the first portion of the first ad slot and the second overlay, the third region corresponding to the third vertical position.

Accordingly, in the foregoing example, the computer system can identify opportunities for ad slot generation to thereby generate a cohesive ad flow such that a viewer perceives a seamless transition from a first overlay ad slot, to a second in-line ad slot, to a third overlay ad slot by rendering distinct regions of the interactive digital ad respective to vertical positions of the second in-line ad slot within the webpage.

For example, the computer system can then: serve a first interactive digital ad—in a set of interactive digital ads of an ad package generated for a first ad campaign —to a first image player at the first ad slot (e.g., a header) proximal a top of the webpage; and, in response to generating the second ad slot, serve a second interactive digital ad—in the set of interactive digital ads of the ad package generated for the first ad campaign —to the second ad slot (e.g., an overlay ad slot, an in-line ad slot).

The computer system can therefore selectively generate additional ad slots (or "ad opportunities") on the webpage in order to enable serving of an package generated (e.g., pre-generated, generated in real-time) for a particular campaign, thereby increasing opportunity for brand lift (e.g., brand awareness) and/or conversions (e.g., product purchases) associated with this particular campaign, by sequentially exposing the user viewing interactive digital ads, in the ad package, to the ad campaign.

4. Ad Package: Interactive Digital Ads

Generally, the computer system can select a particular ad package—including a set of interactive digital ads generated for a single ad campaign (e.g., associated with a particular brand)—for presenting across a suite of ad slots loaded on a webpage. In particular, the computer system can selectively serve multiple interactive digital ads—including content associated with a particular campaign, brand, or product—to multiple ad slots inserted on a single webpage (or any other type of electronic document) rendered by a computing device accessed by a user, in order to drive user engagement with this particular campaign and/or increase a likelihood of achieving a target outcome—such as brand lift, viewability, conversion, etc.—defined for the campaign.

In one example, the computer system can: access an ad package—including a first interactive digital ad and a second interactive digital ad—associated with an ad campaign; serve the first interactive digital ad to a first image player for presentation within a first ad slot loaded within the webpage rendered by a computing device accessed by a user; and serve the second interactive digital ad to a second image player for presentation within a second ad slot—pre-loaded and/or selectively generated—within the webpage. The computer system can therefore leverage the first and second interactive digital ads—configured to communicate a cohesive and/or continuous story associated with a particular campaign—to serve responsive, serialized branded content to a user through a sequence of image players loaded within an electronic document (e.g., a webpage) rendered by a computing device (e.g., a smartphone, a tablet, a laptop or desktop computer) accessed by the user.

In one implementation, the computer system can receive content—such as including video, images, text, etc.—from a brand for an ad campaign; generate a set of interactive digital ads for this ad campaign; and selectively serve this set of interactive digital ads—defining an ad package—to sets of ad slots loaded on webpages. Additionally or alternatively, in another implementation, the computer system generates a set of interactive digital ads—forming an ad package for presentation across a set of ad slots loaded within a webpage—in (near) real-time before serving this ad package to the user's computing device for rendering within the set of ad slots. In this implementation, the computer system can: receive identification of a digital ad (e.g., a video ad) selected for an ad slot on a webpage; and extract content—such as video segments, images, text, etc.—from this digital ad to automatically transform this digital ad into a set of interactive digital ads.

4.1 Ad Package: Scroll-Responsive Content

In one implementation, the computer system can select a set of interactive digital ads (i.e., an ad package)—for presentation within a set of ad slots loaded within a webpage—of a scroll-type format configured to update content rendered within the set of interactive digital ads responsive to scroll events (e.g., scroll-down event, scroll-up event) entered by the user within the webpage.

In particular, as described in U.S. patent application Ser. No. 15/217,879, filed on 22 Jul. 2016—which is incorporated in its entirety by this reference—each interactive digital ad, in the set of interactive digital ads, can include dynamic images (e.g., a GIF) representing a sequence of frames. The computer system and/or image player—inserted at a corresponding ad slot within the webpage—can then index through these frames responsive to scroll inputs entered by the user within the engagement data. For example, as a user navigates through the webpage (or other external document) loaded with the image player, the image player can: seek or step forward through a sequence of frames (or a subset of the sequence of frames) during scroll-down events; and seek backward through the sequence of frames (or subset of frames) during scroll-up events. The image player can thus link content of the interactive digital ad rendered within the image player at any given time to the (vertical) position of the image player rendered within the electronic document by the computing device, thereby enabling the user both to view the sequence of frames as a short (e.g., one-second) video clip by quickly scrolling the image player between the bottom and top of the window and to visually consume each frame separately by moving the image player to discrete positions within the window rendered on the computing device.

In this implementation, the computer system can select an ad package—including a set of interactive digital ads of a scroll-type format and including dynamic images representing a sequence of frames—generated for a first ad campaign for presentation within the set of ad slots loaded within the webpage.

In particular, in one example, the computer system can: render a first region of the first image file within the first ad slot by rendering the first region of the first image file within the first ad slot arranged in a first position of the electronic document proximal a top of the electronic document; and render a first region of a second image file, corresponding to the first frame in the second subset of frames within the second ad slot by rendering the first region of the second image file within the second ad slot arranged in a second position of the electronic document, the second position of the electronic document below the first position of the electronic document.

More specifically, in this example, the computer system can select: a first interactive digital ad—including a first subsequence of frames in the sequence of frames—for presenting within a first image player at a first ad slot, in the set of ad slots, inserted proximal a top of the webpage; and a second interactive digital ad—including a second subsequence of frames, succeeding the first subsequence of frames, in the sequence of frames—for presenting within a second image player at a second ad slot, in the set of ad slots, inserted proximal a bottom of the webpage and/or below the first ad slot within the webpage.

Furthermore, in this example, the first image player can link each frame, in the first subsequence of frames, to a vertical position of the first image player rendered on the computing device. Similarly, the second image player can link each frame, in the second subsequence of frames, to a vertical position of the second image player rendered on the computing device.

In another example, the computer system can access a first interactive digital ad including a first sequence of frames and defining: a first image file compiled of a first subset of frames in the first sequence of frames; and a second image file including a final frame of the interactive digital ad, the final frame including a call-to-action associated with content within the interactive digital ad in Block S142. More specifically, in this example, the computer system can cooperate with the second ad slot to, in response to a scroll event moving the second ad slot to a particular vertical position above the second sequence of vertical positions: render a region of the second image file within the second ad slot, the fourth region of the second image file corresponding to a final frame in the second subset of frames and including a call-to-action associated with content in the first interactive digital ad.

In the foregoing example, the computer system can select and/or render a call-to-action defining: a prompt to purchase a clothing item advertised in the interactive digital ad; a link to a second electronic document where the user may purchase a ticket to a sporting event associated with content advertised in the interactive digital ad; a prompt to donate to a particular cause associated with content advertised in the interactive digital ad; and/or any other type of prompt related to content advertised in the interactive digital ad.

Therefore, as the user scrolls down within the webpage from the top of the webpage toward the bottom of the webpage, the first and second image players can cooperate to seek forward through the sequence of frames—split between the first interactive digital ad and the second interactive digital ad—such that, as the second image player moves into the viewing window of the computing device, a user viewing the webpage may perceive continuous forward "playback" of the sequence of frames across the first and second interactive digital ads. The computer system can therefore leverage multiple ad slots within the webpage to serve coordinated, highly-engaging interactive digital ads configured to promote continuity between interactive digital ads on the webpage and user engagement with these interactive digital ads.

4.1.1 Scroll-Responsive Content: Rolling Object Example

In one example, the computer system can select an ad package including: a first interactive digital ad of the scroll-type format and including a first sequence of frames depicting a rolling object (e.g., a car, a bicycle, a soccer ball), such that the rolling object appears to "roll" downward toward a bottom of a last frame, in the first sequence of frames, while seeking forward through the first sequence of frames; and a second interactive digital ad of the scroll-type format and including a second sequence of frames depicting the rolling object, such that the rolling object appears to enter a first frame—in the second sequence of frames—from a top of the first frame and continue rolling toward a bottom of a final frame in the second sequence of frames, while seeking forward through the second sequence of frames. The computer system can thus: serve the first interactive digital ad to a first image player inserted within a first ad slot located proximal a top of a webpage; and serve the second interactive digital ad to a second image player inserted within a second ad slot located below the first ad slot within the webpage. In this example, the first image player can: render an initial frame of the first interactive digital ad in response to an event (e.g., a click event, a scroll event) that locates the first image player within a viewing window of a computing device rendering the webpage; and, in response to a first scroll-down event that moves the first image player upward within the viewing window, seek through frames, in the first sequence of frames, from the initial frame toward the last frame, such as at a seek rate corresponding to a scroll rate of the first scroll-down event.

Then, during the first scroll-down event, as the second image player enters the viewing window, the first image player can render the final frame, in the first sequence of frames, depicting the rolling object at the bottom of the final frame. Simultaneously, the second image player can render the first frame, in the second sequence of frames, depicting the rolling object at the top of the first frame. Then, as the first scroll-down event continues—moving the first image player further upward and/or out of the viewing window and moving the second image player upward within the viewing window—the second image player can seek through frames, in the second sequence of frames, from the first frame toward the final frame, such as at a seek rate corresponding to the scroll rate. The user may thus perceive the rolling object as rolling downward from the first interactive digital ad directly into the second interactive digital ad, thereby visually engaging the user and promoting scrolling of the user (e.g., up and/or down) to trigger this animation.

In this preceding implementation, the method S100 is generally described a method for generating and serving a set of interactive visual ads based on scroll events that move an image player vertically within a viewing window rendered on a display of a computing device. However, the method S100 can be implemented to generate and serve any other type of visual content based on any other scroll or scroll-like input, such as horizontal scroll events or rotational or actuate gestures at a computing device.

4.2 Ad Package: Single Interactive Digital Ad

In one variation, the computer system can generate an ad package, or a (single) interactive digital ad including a sequence of frames, by segmenting the sequence of frames into subsets of frames and/or (static) image files. In particular, the computer system can, during a first time period: access a first interactive digital ad including a first sequence of frames; compile a first subset of frames, in the first sequence of frames, into a first image file; and compile a second subset of frames, in the first sequence of frames, into a second image file.

The computer system and/or image player—inserted at a corresponding ad slot within the electronic document—can then selectively render regions of these image files responsive to scroll inputs entered by the user. For example, as a user navigates through the webpage (or other external document) loaded with the computing device, the image player can seek or step forward through the first subset of frames by rendering (a sequence of) regions of the first image file—corresponding to positions of the first ad slot—during scroll-down events.

In one example, the computer system can selectively render regions of these image files responsive to a rate of a scroll input entered by the user. In particular, in this example, the computer system can: detect a second scroll event—moving the first ad slot over a first sequence of vertical positions above the first vertical position within the viewing window—at a first scroll rate; and render the first sequence of regions of the first image file at a first frame rate proportional to (e.g., approximately equivalent to) the first scroll rate.

The image player can thus link content of the interactive digital ad rendered within the image player at any given time to the (vertical) position of the image player rendered within the electronic document by the computing device, thereby enabling the user both to view the sequence of frames as a short (e.g., one-second) video clip by quickly scrolling the image player between the bottom and top of the window and to separately visually consume each frame by moving the image player to discrete positions within the window rendered on the computing device proportional to a scroll rate.

4.3 Single Interactive Digital Ad: Crop Area+Geometry

In one implementation, an image player—inserted into an ad slot—can selectively render regions of a static image file by translating a crop area (e.g., an aperture) over these regions.

In one example, the computer system can insert a first image player into a first ad slot on an electronic document, the first image player configured to: locate a crop area over the first region of the first image file; render the first region bounded by the crop area; translate the crop area over the first sequence of regions of the first image file (e.g., at a first frame rate proportional a first scroll rate of a second scroll event); and render the first sequence of regions of the first image file, bounded by the crop area, within the first ad slot during the second scroll event.

In particular, in this example, the first image player can locate the crop area over regions of the image file, the crop area defining a geometry related to content of the image file (and/or the interactive digital ad, an ad package, an ad campaign). More specifically, the computer system (and/or the image player) can: access a crop area defining a geometry associated with content in the first interactive digital ad (e.g., from an ad container associated with the first interactive digital ad; from a server); and locate the crop area, defining the geometry, over the first region of the first image file. Therefore, in this example, a user viewing the interactive digital ad on the electronic document may perceive a more cohesive storyline based on correspondence between the crop area geometry and content within the interactive digital ad.

Furthermore, in this implementation, the image player can translate the crop area directionally proportional to scroll events input by the user. In particular, the image player can: translate the crop area over the first sequence of regions in a first direction at the first frame rate proportional the first scroll rate of a first scroll event; and, in response to a second scroll event moving the first ad slot to a second vertical position above the first sequence of vertical positions at a second scroll rate, translate the crop area over the first sequence of regions of the first image file in a second direction opposite the first direction at a second frame rate proportional the second scroll rate of the second scroll event. Accordingly, the image player can "seek backward" though the first subset of frames, associated with the first image file, by translating the crop area over the sequence of regions of the first image file directionally proportional to scroll-up or scroll-down events.

4.4 Ad Package: Video Segments

In one implementation, the computer system can leverage a video generated for a particular ad campaign to selectively serve a set of interactive digital ads, each including content extracted from the video and/or serve portions (e.g., subset of frames) of the video to a suite of ad slots across a webpage. In this implementation, the computer system can, therefore, sequentially expose a user—viewing the set of interactive digital ads on a webpage (or any other electronic document)—to content extracted from the video provided for the ad campaign via selective presentation of these interactive digital ads across multiple ad slots on the webpage.

In one example, the computer system—such as in cooperation with an ad server—can: serve a first interactive digital ad—including a first segment of a digital video including video content associated with a particular brand—into a first image player inserted in a first ad slot proximal a top of a webpage; and serve a second interactive digital ad—including a second segment of the digital video succeeding the first segment—into a second image player inserted into a second ad slot below the first ad slot within the webpage. In particular, in this example, the first interactive digital ad can be configured to include a first sequence of frames of the digital video and the second interactive digital ad can be configured to include a second sequence of frames including an initial frame corresponding to a last frame—in the first sequence of frames—of the first interactive digital ad. More specifically, the computer system can generate the second interactive digital ad by: identifying a final frame in the first subset of frames; identifying a second frame, succeeding the final frame, in the sequence of frames; and selecting the second subset of frames including the second frame.

More specifically, in this example, the computer system can: access a digital video including a sequence of frames; compile a first subset of frames into a first interactive digital ad; and compile a second subset of frames into a second interactive digital ad, the second subset of frames succeeding the first subset of frames in the sequence of frame. Then, the computer system can: render the first subset of frames at a first ad slot; and render the second subset of frames at a second ad slot below the first ad slot, such that a user may perceive a cohesive flow throughout playback of the digital video.

In one implementation, the computer system can insert the interactive digital video into: the first ad slot including a first event dispatcher configured to publish triggers in response to user interactions occurring at the first ad slot; and the second ad slot including a first event listener configured to receive triggers published by the first event dispatcher.

The computer system (and/or a first image place inserted into the first ad slot) can, in response to the second scroll event moving the first ad slot out of the viewing window and moving the second ad slot into the viewing window and at the first event dispatcher: generate a first trigger including a frame identifier associated with a final frame in the first subset of frames; and transmit the first trigger to a browser rendering the webpage. The computer system (and/or a second image place inserted into the second ad slot) can then: at the first event listener, receive the first trigger from the browser; and, at the second ad slot, select the second subset of frames based on the frame identifier associated with the final frame in the first subset of frames, an initial frame in the second subset of frames corresponding to a succeeding frame to the final frame based on the sequence of frames. Accordingly, the first ad slot can push triggers to the browser via an event dispatcher to "alert" or "notify" the second ad slot of a final frame rendered within the first ad slot such that the second ad slot can render an initial frame, corresponding to (e.g., the same as) the final frame rendered within the first ad slot, to thereby enable a user to view the digital video as a cohesive video (e.g., rather than a sequence of disjoined frames) across a sequence of ad slots across a webpage.

In another implementation, the computer system (and/or image player inserted into an ad slot) can seek through playback of a digital video proportional to scroll events input by the user at the computing device, such as increasing a playback speed (or frame rate) proportional to a scroll rate of a scroll event.

In this implementation, the computer system (and/or image player inserted into an ad slot) can: access an interactive digital ad including a first digital video including a sequence of frames. Then, at a webpage rendered by the computing device accessed by the user, the computer system can: in response to a first scroll event locating a first ad slot, at a first vertical position within the second webpage, into the viewing window of the computing device, initiate (forward) playback of the digital video from a first frame in the sequence of frames to a second frame in the sequence of frames at a preset video frame rate, the second frame succeeding the first frame in the digital video; in response to a second scroll event, at a first scroll rate, moving the first ad slot over a first sequence of vertical positions above the first vertical position within the viewing window, replay the digital video forward from the second frame to a third frame in the sequence of frames at a first frame rate proportional to the first scroll rate, the third frame succeeding the second frame in the digital video; and, in response to termination of the second scroll event, play the digital video forward from the third frame to a fourth frame at the preset video frame rate, the fourth frame succeeding the third frame in the digital video.

Then, the computer system and/or image player can: detect a second scroll event, at a second scroll rate, moving the first ad slot over a second sequence of vertical positions below the first sequence of vertical positions within the viewing window in Block S150; and the image player can replay the digital video backward from the fourth frame to a fifth frame at a second frame rate proportional to the second scroll rate, the fifth frame between the first frame and the fourth frame in the digital video, in Block S152. In the foregoing example, the computer system can accordingly trigger playback of the video at a rate and/or direction proportional to scroll inputs by a user.

In the preceding example, the computer system can: via the first image player, trigger playback of the first segment of the digital video within the first image player in response to the first ad slot falling within a viewing window of the computing device; and, via the second image player, in response to a scroll event that locates the second ad slot within the viewing window, trigger playback of the second segment of the digital video within the second image player. Therefore, as the user scrolls down the webpage—locating the second ad slot within the viewing window approximately concurrent the first ad slot exiting the viewing window—the second image player can: render the initial frame corresponding to the last frame rendered by the first image player; and trigger forward playback of the second sequence of frames from the initial frame, thereby seamlessly continuing playback of the digital video between the first and second interactive digital ads as the second interactive digital ad enters the viewing window.

The computer system can therefore: selectively extract a sequence of video segments (or "scenes") from a video generated for an ad campaign; and transform this series of video segments into a set of interactive digital ads forming an ad package. The computer system can then serve this ad package to a set of ad slots inserted within a webpage—each ad slot, in the set of ad slots, loaded with an image player configured to trigger playback of a corresponding interactive digital ad within the ad slot—to sequentially present this sequence of video segments to the user as the user scrolls down the webpage.

4.5 Ad Package: One Video+Multiple Formats

Additionally or alternatively, in another implementation, the computer system can selectively extract video segments and/or individual frames (e.g., static images) from a digital video—generated for a particular ad campaign—and transform these video segments and/or individual frames into a set of interactive digital ads of varying formats configured to further drive user engagement with the ad campaign. The computer system can then serve this set of interactive digital ads—as an ad package—to a set of ad slots inserted within a webpage. The computer system can therefore sequentially expose the user—viewing the set of interactive digital ads on the webpage (or any other electronic document)—to video segments, images, and/or other visual content extracted from the video as the user scrolls through the webpage, thus moving the set of ad slots into a viewing window of a computing device (e.g., accessed by the user) rendering the webpage.

In particular, in this implementation, the computer system can leverage content—including video, images, colors, themes, text, etc.—extracted from a video generated for the ad campaign to generate a set of interactive digital ads: of varying responsive formats configured to draw the user's attention to the set of interactive digital ads and therefore promote user engagement with the ad campaign; and including content associated with a particular theme or subject (e.g., a consumer good, a service, a television show), such that in combination, the set of interactive digital ads communicate a particular story associated with the theme and/or sequentially provide further context—regarding the particular theme or subject—to the user.

In one example, the computer system can: access a video—such as a video trailer generated for a television show—generated for an ad campaign for the television show; extract a video segment (e.g., a 5-second video clip, a 10-second video clip) from the video depicting a setting associated with the television show; extract an image—corresponding to a particular frame of the video—depicting a character in the television show; and extract a set of text—such as in a particular font, color, size, etc.—representing a title of the television show.

The computer system can then: transform the video segment into a first interactive digital ad including the video segment, the set of text—in the particular font, color, size, etc.—overlaid the video segment, and a call-to-action— including a hyperlink linked to viewing of the television show—stating "Watch Now" arranged adjacent the video segment within the first interactive digital ad; transform the image—depicting the particular character—into a second interactive digital ad of a scroll-type format and including the set of text overlaid the image and the call-to-action arranged adjacent the image within the second interactive digital ad.

Then, the computer system can: serve the first interactive digital ad—packaged with a first image player—to a first ad slot loaded within a webpage rendered by a computing device; and serve the second interactive digital ad—packaged with a second image player—to a second ad slot loaded below the first ad slot within the webpage. In response to an event—such as a click or scroll event—that locates the first ad slot within a viewing window of the computing device, the first image player can trigger playback of the video segment while the first image player remains within the viewing window. Then, in response to a first scroll event that moves the second image player within the viewing window, the second image player can render a first region—of a first size—of the image, such as depicting an eye, face, accessory, or any other feature of the character within the image player. Then, as the user continues to scroll down within the webpage during the first scroll event, the second image player can render a sequence of regions—expanding radially outward from the first region and therefore of increasing size—corresponding to a sequence of positions of the second image player within the webpage. Finally, in response to the second image player moving to a particular position within the viewing window, the second image player can render a final region of the image corresponding to a full size of the image and depicting the character and the set of text (e.g., the title) overlaid the image.

In the preceding example, the computer system can therefore leverage both the first and second interactive digital ads—served within the first and second ad slots on the webpage—to provide context related to the setting and character(s) of the television show, and therefore communicate a single, cohesive story across the set of interactive digital ads served to this user on the webpage. Furthermore, the computer system can drive user engagement with the ad campaign by packaging content extracting from video (or other type of visual media) into interactive digital ads of varying responsive formats (e.g., video, scroll-type) and/or including related yet distinct content, such that the user may prefer to engage with interactive digital ads of a particular interactive format and/or including various types of content. The computer system can therefore provide multiple opportunities for the user to engage with the ad campaign—such as via the first or second interactive digital ad—within one webpage.

5. User Engagement

Generally, the computer system can track user interactions with ad content presented within one or more image players inserted within an electronic document (e.g., webpage, landing page) rendered by a user computing device.

In one implementation, an image player—inserted into an ad slot on a particular electronic document—can: record a first set of engagement data including a count of scroll events that render the first ad slot in the viewing window and durations of scroll events occurring at the computing device in Block S160; characterize an engagement level (e.g., high, low) for the first interactive digital ad based on the first set of engagement data in Block S162; and serve the engagement level to a remote interaction database (e.g., the computer system). In this implementation, the computer system can characterize an engagement level (e.g., high, low) for the first interactive digital ad proportional to a count of scroll events that render the first ad slot in the viewing window and/or proportional to durations of scroll events occurring at the computing device.

In particular, the computer system can: collect engagement data (e.g., clicks, scrolls, swipes, viewability, video completion) related to interactions between one or more interactive digital ads—presented within the electronic document—and a user viewing these interactive digital ads at a computing device accessed by the user; and package these engagement data into one or more metrics indicative of user engagement with the one or more interactive digital ads.

In one implementation, the computer system can track engagement of a user with each interactive digital ad in an ad package—served to the user within a single electronic document—associated with a particular ad campaign.

In particular, in this implementation, the computer system can: access a first set of engagement data (e.g., clicks, views, swipes, scrolls)—representing interactions of the user with the first interactive digital ad rendered within the first ad slot on the webpage—recorded by the first image player; and access a second set of engagement data—representing interactions of the user with the second interactive digital ad rendered within the second ad slot on the webpage—recorded by the second image player. The computer system can then: characterize user engagement—such as represented by a first engagement metric—with the first interactive digital ad based on the first set of engagement data; and characterize user engagement—such as represented by a second engagement metric—with the second interactive digital ad based on the second set of engagement data. The computer system can then leverage both the first and second engagement metric to selectively serve additional content to this user and/or to inform future presentation of interactive digital ads in the ad campaign.

5.1 Real-Time Selection of Second Interactive Digital Ad

In one implementation, the computer system can select a second interactive digital ad—for rendering within a second image player loaded within the second ad slot on the webpage—based on recorded interactions of the user with a first interactive digital ad rendered within a first image player loaded within a first ad slot on the webpage. In particular, in this implementation, the computer system can: predict a particular format for content presented within the second image player at the second ad slot—predicted to yield a target outcome defined for an ad campaign—based on recorded user interactions with a first interactive digital ad, in the ad campaign, presented within the first image player loaded within the first ad slot.

In one example, the computer system can cooperate with an image player, inserted into the first ad slot, to select a second interactive digital ad based on a format of the first interactive digital ad. In particular, the computer system can calculate a first engagement score (e.g., 9) based on the engagement level (e.g., high) for the first interactive digital ad in Block S163. Then, in response to the first engagement score exceeding a threshold engagement score, the computer system can: identify a first format of the first interactive digital ad based on the first sequence of frames; and identify a second interactive digital ad characterized by the first format, such as from an ad campaign associated with the first interactive digital ad and containing a set of interactive digital ads related to the ad campaign in Block S164. During a second time period, the computer system can: access the second interactive digital ad, including a second sequence of frames; and compile a third subset of frames, in the second sequence of frames, into a third image file. At a second electronic document rendered by the computing device, the computer system and/or a second image player can, in response to a fifth scroll event locating a third ad slot, at a third vertical position within the second electronic document, into the viewing window of the computing device, render a first region of the third image file within the third ad slot. Accordingly, in the foregoing example, the computer system can cooperate with the image player to selectively render consecutive advertisements for a user based on high engagement (e.g., interaction) with ads of that particular format.

In a similar example, the computer system can cooperate with an image player, inserted into the first ad slot, to select a second interactive digital ad based on content within the first interactive digital ad. In particular, the computer system can: calculate a first engagement score (e.g., 8.7) based on the engagement level (e.g., high) for the first interactive digital ad. Then, in response to the first engagement score exceeding a threshold engagement score, the computer system can: identify a first content type (e.g., soccer, the World Cup, women's basketball) of the first interactive digital ad based on the first sequence of frames; and identify a second interactive digital ad characterized by the first content type, such as from an ad campaign associated with the first interactive digital ad and containing a set of interactive digital ads related to the ad campaign. During a second time period, the computer system can: access the second interactive digital ad including a second sequence of frames; and compile a third subset of frames, in the second sequence of frames, into a third image file. At a second electronic document rendered by the computing device, the computer system and/or a second image player can, in response to a fifth scroll event locating a third ad slot, at a third vertical position within the second electronic document, into the viewing window of the computing device, render a first region of the third image file within the third ad slot. Accordingly, in the foregoing example, the computer system can cooperate with the image player to selectively render consecutive advertisements for a user based on high engagement (e.g., interaction) with ads containing similar (e.g., related) content.

For example, in this implementation, the computer system can: receive identification of a first ad slot proximal a top of the webpage and a second ad slot below the first ad slot within the webpage, such as proximal a middle or bottom of the webpage; select a first interactive digital ad of a first interactive format—such as a banner video format or a scroll-type format (e.g., responsive to scroll inputs)—in a first ad campaign for presenting within the first image player at the first ad slot; and, in response to serving of the first interactive digital ad of the first interactive format to the first image player, access a first set of user engagement data—including clicks, scrolls, views, etc.—representing user interactions with the first interactive digital ad.

Then, the computer system can: predict user engagement with ad content of a set of interactive formats based on the first set of user engagement data; identify a second interactive format, in the set of interactive formats, corresponding to high predicted user engagement with ad content of the second interactive format; and select a second interactive digital ad, from a set of interactive digital ads in the first ad campaign, of the second interactive ad format, for serving to the second image player loaded within the second ad slot, such as prior to an event (e.g., a scroll event) that locates the second ad slot within a viewing window of the user computing device. Additionally or alternatively, in this example, the computer system can generate the second interactive digital ad—according to the second interactive format—in (near) real time.

Additionally or alternatively, in another implementation, the computer system can selectively generate a second ad slot on the webpage—for presenting a second interactive digital ad in an ad campaign—based on user engagement with a first interactive digital ad, in the ad campaign, presented within a first ad slot rendered within the webpage. In particular, in this implementation, the computer system can: receive identification of a first ad slot proximal a top of a webpage rendered by a computing device accessed by a user; select a first interactive digital ad, in a set of interactive digital ads associated with a first ad campaign, for presenting within a first image player loaded within the first ad slot; and, in response to serving of the first interactive digital ad to the first image player for presentation within the first ad slot, access a first set of user engagement data—including clicks, scrolls, views, etc.—representing user interactions with the first interactive digital ad. Then, in response to the first set of engagement data anticipating a target outcome (e.g., viewability, click-through, video completion) defined for the first ad campaign, the computer system can selectively: generate a second ad slot on the webpage, such as below the first ad slot and outside a viewing window of the computing device; and select a second interactive digital ad—in the set of interactive digital ads associated with the first ad campaign—for presentation with a second image player at the second ad slot, prior to an event that locates the second ad slot within the viewing window. Alternatively, in response to the first set of engagement data anticipating failure of the target outcome—thus indicating relatively low engagement of the user with content associated with the first ad campaign—the computer system can withhold generation of the second ad slot and thereby withhold presenting of the second interactive digital ad to the user within the webpage.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising, during a first time period:
accessing a first digital ad comprising a first sequence of frames;
compiling a first subset of frames, in the first sequence of frames, into a first image file;
compiling a second subset of frames, in the first sequence of frames, into a second image file; and
at an electronic document rendered by a computing device accessed by a user:
in response to a first scroll event locating a first media player at a first vertical position within a viewing window of the computing device, rendering a first frame of the first image file within the first media player;
in response to a second scroll event moving the first media player over a first sequence of vertical positions above the first vertical position within the viewing window, rendering the first sequence of frames of the first image file within the first media player, the first sequence of frames corresponding to the first sequence of vertical positions of the first media player within the viewing window;
in response to a third scroll event moving the first media player to a second vertical position above the first sequence of vertical positions and moving a second media player into a third vertical position, below the second vertical position, within the viewing window, the second media player located below the first media player within the electronic document:
rendering a final frame, in the first subset of frames, within the first media player; and
rendering an initial frame in the second subset of frames, within the second media player, the initial frame in the second subset of frames succeeding the final frame in the first subset of frames within the first sequence of frames of the first digital ad; and
in response to a fourth scroll event moving the second media player over a second sequence of vertical positions above the third vertical position within the viewing window, rendering the second sequence of frames of the second image file within the second media player, the second sequence of frames corresponding to the second sequence of vertical positions of the second media player within the viewing window.

2. The method of claim 1:
wherein rendering the first frame of the first image file within the first media player comprises rendering the first frame of the first image file within the first media player arranged in a first position of the electronic document proximal a top of the electronic document; and
wherein rendering the fourth frame of the second image file, corresponding to the initial frame in the second subset of frames within the second media player comprises rendering the fourth frame of the second image file within the second media player arranged in a second position of the electronic document, the second position of the electronic document below the first position of the electronic document.

3. The method of claim 1 wherein rendering the first sequence of frames of the first image file in response to the second scroll event moving the first media player over the first sequence of vertical positions comprises rendering the first sequence of frames of the first image file at a first frame rate in response to the second scroll event moving the first media player over the first sequence of vertical positions at a first scroll rate, the first frame rate proportional the first scroll rate.

4. The method of claim 3:
wherein rendering the first frame of the first image file within the first media player comprises:
    locating a crop area over the first frame of the first image file; and
    rendering the first frame bounded by the crop area; and
wherein rendering the first sequence of frames of the first image file at the first frame rate proportional to the first scroll rate comprises:
    translating the crop area over the first sequence of frames of the first image file at the first frame rate proportional the first scroll rate of the second scroll event; and
    rendering the first sequence of frames of the first image file, bounded by the crop area, within the first media player during the second scroll event.

5. The method of claim 4:
wherein translating the crop area over the first sequence of frames of the first image file at the first frame rate proportional the first scroll rate of the second scroll event comprises translating the crop area over the first sequence of frames in a first direction at the first frame rate proportional the first scroll rate of the second scroll event; and
further comprising, in response to a fifth scroll event moving the first media player to a second vertical position above the first sequence of vertical positions at a second scroll rate:
    translating the crop area over the first sequence of frames of the first image file in a second direction opposite the first direction at a second frame rate proportional the second scroll rate of the fifth scroll event.

6. The method of claim 4:
wherein locating the crop area over the first frame of the first image file comprises:
    accessing a crop area defining a geometry associated with content in the first digital ad; and
    locating the crop area defining the geometry over the first frame of the first image file.

7. The method of claim 1, further comprising:
accessing a second digital ad comprising a first digital video comprising a second sequence of frames; and
at a second electronic document rendered by the computing device accessed by the user:
    in response to a fifth scroll event locating a third media player, at a third vertical position within the second electronic document, into the viewing window of the computing device, initiating playback of the first digital video from a first frame in the second sequence of frames to a second frame in the second sequence of frames at a preset video frame rate, the second frame succeeding the first frame in the first digital video;
    in response to a sixth scroll event, at a first scroll rate, moving the third media player over a second sequence of vertical positions above the third vertical position within the viewing window, replaying the first digital video forward from the second frame to a third frame in the second sequence of frames at a first frame rate proportional to the first scroll rate, the third frame succeeding the second frame in the first digital video; and
    in response to termination of the sixth scroll event, replaying the first digital video forward from the third frame to a fourth frame at the preset video frame rate, the fourth frame succeeding the third frame in the first digital video.

8. The method of claim 7, further comprising:
in response to a seventh scroll event, at a second scroll rate, moving the third media player over a third sequence of vertical positions below the second sequence of vertical positions within the viewing window:
    replaying the first digital video backward from the fourth frame to a fifth frame at a second frame rate proportional to the second scroll rate, the fifth frame between the first frame and the fourth frame in the first digital video.

9. The method of claim 1:
further comprising:
    at the first media player, recording a first set of engagement data comprising a first count of scroll events over the first media player;
    at the second media player, recording a second set of engagement data comprising a second count of scroll events at the second media player;
    characterizing an engagement level for the first digital ad based on the first set of engagement data and the second set of engagement data; and
    serving the engagement level to a remote interaction database.

10. The method of claim 9, further comprising:
calculating a first engagement score based on the engagement level for the first digital ad; and
in response to the first engagement score exceeding a threshold engagement score:
    identifying a first format of the first digital ad based on the first sequence of frames;
    identifying a second digital ad of the first format; and
    during a second time period:
        accessing the second digital ad comprising a second sequence of frames;
        compiling a third subset of frames, in the second sequence of frames, into a third image file; and
        at a second electronic document rendered by the computing device:
            in response to a fifth scroll event locating a third media player, at a third vertical position within the second electronic document, into the viewing window of the computing device, rendering a first frame of the third image file within the third media player.

11. The method of claim 9, further comprising, in response to the engagement level for the first digital ad corresponding to a target engagement level:
identifying a first content type of the first digital ad based on the first sequence of frames;
identifying a second digital ad characterized by the first content type; and
during a second time period:
    accessing the second digital ad comprising a second sequence of frames;
    compiling a third subset of frames, in the second sequence of frames, into a third image file; and at a second electronic document rendered by the computing device:

in response to a fifth scroll event locating a third media player, at a third vertical position within the second electronic document, into the viewing window of the computing device, rendering a first frame of the third image file within the third media player.

12. The method of claim 1, further comprising:

in response to a fifth scroll event moving the second media player to a fourth vertical position above the second sequence of vertical positions:

rendering a fourth frame of the second image file within the second media player, the fourth frame of the second image file:

corresponding to a second final frame in the second subset of frames; and comprising a call-to-action associated with content in the first digital ad.

13. A method comprising:

accessing a digital video comprising a sequence of frames;

generating a first interactive digital ad comprising a first subset of frames in the sequence of frames;

generating a second interactive digital ad comprising a second subset of frames in the sequence of frames; and at an electronic document rendered by a computing device accessed by a user:

inserting the first interactive digital ad into a first media player on the electronic document, the first media player located proximal a top of the electronic document;

inserting the second interactive digital ad into a second media player on the electronic document, the second media player located below the first media player;

in response to a first scroll event locating the first media player, at a first position within the electronic document, within a viewing window of the computing device:

initiating forward playback of the first interactive digital ad at the first media player; and seeking through the first subset of frames during playback of the digital ad at the first media player;

in response to a second scroll event locating the first media player at a second position, above the first position and proximal a top of the viewing window, within the electronic document and locating the second media player to a third position, proximal a bottom of the viewing window, within the electronic document:

rendering a final frame in the first subset of frames in the first media player; and rendering an initial frame in the second subset of frames in the second media player; and in response to a third scroll event moving the first media player out of the viewing window and moving the second media player to a fourth position within the viewing window, the fourth position above the third position within the viewing window:

initiating forward playback of the second interactive digital ad from the first frame at the second media player; and seeking through the second subset of frames, succeeding the first subset of frames, during playback of the second interactive digital ad at the second media player.

14. The method of claim 13:

wherein inserting the first interactive digital ad into the first media player on the electronic document comprises inserting the first interactive digital ad into the first media player comprising a first event dispatcher configured to publish triggers in response to user interactions occurring at the first media player;

wherein inserting the second interactive digital ad into the second media player on the electronic document comprises inserting the second interactive digital ad into the second media player comprising a first event listener configured to receive triggers published by the first event dispatcher;

further comprising, in response to the second scroll event moving the first media player out of the viewing window and moving the second media player into the viewing window:

at the first event dispatcher:

generating a first trigger comprising a frame identifier associated with a final frame in the first subset of frames; and transmitting the first trigger to a browser rendering the electronic document; and at the first event listener, receiving the first trigger from the browser; and wherein seeking through the second subset of frames, succeeding the first subset of frames, during playback of the second interactive digital ad at the second media player comprises:

at the second media player, selecting the second subset of frames based on the frame identifier associated with the final frame in the first subset of frames, the initial frame in the second subset of frames corresponding to a succeeding frame to the final frame in the sequence of frames.

15. The method of claim 13:

wherein generating the second interactive digital ad comprises:

identifying a final frame in the first subset of frames;

identifying a second frame, succeeding the final frame, in the sequence of frames; and selecting the second subset of frames comprising the second frame.

16. The method of claim 13:

further comprising:

at the first media player, recording a first set of engagement data comprising a first time period during which the first media player was rendered in the viewing window;

at the second media player, recording a second set of engagement data comprising a second time period during which the second media player was rendered in the viewing window;

characterizing an engagement level for the first digital ad based on the first set of engagement data and the second set of engagement data; and serving the engagement level to a remote interaction database.

17. The method of claim 16, further comprising:

accessing a third interactive digital ad comprising a second sequence of frames associated with the first sequence of frames;

compiling a third subset of frames, in the second sequence of frames, into an image file; and in response to the first engagement level approximating a target engagement level:

inserting the third interactive digital ad into a third media player within the electronic document; and in response to a third scroll event locating the third media player, at a third vertical position within the electronic document, into the viewing window of the computing device, rendering the third image file within the third media player.

18. The method of claim 17, wherein compiling the third subset of frames, in the second sequence of frames, into the image file comprises compiling the third subset of frames, in the second sequence of frames, into the image file comprising a call-to-action associated with advertising content in the digital video.

\* \* \* \* \*